United States Patent
Sokol, Jr. et al.

(10) Patent No.: US 9,208,116 B2
(45) Date of Patent: Dec. 8, 2015

(54) MAINTAINING I/O PRIORITY AND I/O SORTING

(71) Applicant: Apple Inc., Cupertino, CA (US)

(72) Inventors: Joseph Sokol, Jr., San Jose, CA (US); Manoj Radhakrishnan, Fremont, CA (US); Matthew J. Byom, San Jose, CA (US); Robert Hoopes, Morgan Hill, CA (US); Christopher Sarcone, Saratoga, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/595,062

(22) Filed: Jan. 12, 2015

(65) Prior Publication Data

US 2015/0127863 A1 May 7, 2015

Related U.S. Application Data

(62) Division of application No. 13/736,846, filed on Jan. 8, 2013, now Pat. No. 8,959,263.

(51) Int. Cl.
| | |
|---|---|
| *G06F 13/00* | (2006.01) |
| *G06F 13/30* | (2006.01) |
| *G06F 13/18* | (2006.01) |
| *G06F 13/37* | (2006.01) |
| *G06F 13/372* | (2006.01) |
| *G06F 3/00* | (2006.01) |

(52) U.S. Cl.
CPC ............... *G06F 13/30* (2013.01); *G06F 13/18* (2013.01); *G06F 13/37* (2013.01); *G06F 13/372* (2013.01)

(58) Field of Classification Search
CPC .................................. G06F 13/00; G06F 3/00
USPC ........ 710/5–6, 29, 36, 40, 111–112, 123–124
See application file for complete search history.

(56) References Cited

U.S. PATENT DOCUMENTS

| | | | |
|---|---|---|---|
| 3,921,145 A | 11/1975 | Emm et al. | |
| 4,628,447 A | 12/1986 | Cartret et al. | |
| 5,812,799 A | 9/1998 | Zuravleff et al. | |
| 5,867,735 A | 2/1999 | Zuravleff et al. | |
| 6,745,307 B2 | 6/2004 | McKee | |
| 6,810,437 B1 | 10/2004 | Nihei | |
| 7,752,362 B2 | 7/2010 | Nishimoto et al. | |
| 7,895,373 B2 | 2/2011 | Imai | |
| 8,959,263 B2 * | 2/2015 | Sokol et al. ..................... | 710/40 |
| 2003/0072317 A1 * | 4/2003 | Yuang et al. .................. | 370/412 |
| 2006/0106752 A1 * | 5/2006 | Jones et al. ..................... | 707/1 |

(Continued)

*Primary Examiner* — Christopher Shin
(74) *Attorney, Agent, or Firm* — Blakely, Sokoloff, Taylor & Zafman LLP

(57) ABSTRACT

Multiple variants of a data processing system, which maintains I/O priority from the time a process makes an I/O request until the hardware services that request, will be described. In one embodiment, a data processing system has one or more processors having one or more processor cores, which execute an operating system and one or more applications of the data processing system. The data processing system also can have one or more non-volatile memory device coupled to the one or more processors to store data of the data processing system, and one or more non-volatile memory controller coupled to the one or more processors. The one or more non-volatile memory controller enables a transfer of data to at least one non-volatile memory device, and the priority level assigned by the operating system is maintained throughout the logical data path of the data processing system.

20 Claims, 8 Drawing Sheets

(56) References Cited

U.S. PATENT DOCUMENTS

| | | |
|---|---|---|
| 2007/0038792 A1 | 2/2007 | Shin |
| 2009/0254686 A1 | 10/2009 | Jeong |
| 2010/0281486 A1 | 11/2010 | Lu et al. |
| 2011/0213945 A1 | 9/2011 | Post et al. |
| 2012/0173786 A1 | 7/2012 | Simon et al. |
| 2013/0013835 A1 | 1/2013 | Kurihara et al. |
| 2014/0068128 A1 | 3/2014 | Maeda |

* cited by examiner

Fig. 4    Priority I/O Rate Limiting - 400

MAINTAINING I/O PRIORITY AND I/O SORTING

This application is a divisional of co-pending U.S. application Ser. No. 13/736,846 filed on Jan. 8, 2013.

BACKGROUND OF THE INVENTION

Modern data processing systems utilize a combination of hardware, drivers, and operating systems that allow input/output (I/O) operations to a storage device that are requested by an application to be prioritized. These priorities can be used to determine the speed in which a process or thread of an application dispatches I/O commands. However, once an I/O operation has been dispatched, lower level components of the system are not aware of the priority of the operation, so the operations are queued and processed in a First in First out (FIFO) Method. In some circumstances, it is possible for a low priority operation that has been previously dispatched to delay the performance of a high priority operation behind it in the queue.

FIG. 1 is a flow diagram illustrating an example command flow and prioritization used by conventional operating systems on conventional data processing systems. The I/O infrastructure of a data processing system generally includes one or more user applications 102 executing on an operating system 106 are dispatched with various priority levels depending on operating system. Before an I/O request reaches the underlying hardware, the request is serviced by several system components, including at least a the system 110, and a block storage device manager 114. If semiconductor memory is used as a non-volatile storage device, a non-volatile memory translation layer 118 ran be used to translate I/O operations to a form that can be processed by a nonvolatile memory controller 122, which understands the underlying memory architecture of an attached nonvolatile memory device.

Generally, at least a high and low priority system is in place for application processes, and generally the I/O operations dispatched by the application processes share the priority of the dispatching process. Applications can dispatch prioritized storage I/O requests 104 to the operating system 106, and the operating system 106 will service those prioritized requests 104 according to some priority scheme. Once serviced, however, the commands relayed by the operating system 106 are non-prioritized 108. The file system 110 and block storage device 114 generally will not have a mechanism to prioritize commands in a manner consistent with the priority used by the operating system 106. In the event a file system 110 or block storage device 114 are able to create an internal priority system based on some internal concept of what data is or is not important, it is not certain the internal priority will be consistent with the best overall system performance. Accordingly, file system 110 and block device 114 operations may be performed without regard to a preferred prioritization scheme, and non-prioritized I/O requests 112, 116 may be made to the lower levels of the I/O infrastructure of the data processing system. As the I/O requests proceeds further away from the operating system, and further towards the hardware, the processing order of the I/O operations becomes increasingly nondeterministic. Once the nonvolatile memory translation layer 118 is reached, I/O operations that once were high priority may be trapped behind lower priority operations. Non-prioritized I/O operations 120 dispatched to the non-volatile memory controller 122 can cause excessive latency if an ostensibly "high" priority operation is queued after numerous low priority commands that do not require immediate service, or behind commands that are known to take a longer than average time to complete. Accordingly, the original prioritization scheme of the prioritized I/O 104 may have been lost by the time non-prioritized I/O 124 dispatched to the nonvolatile memory device 126 arrives.

SUMMARY OF THE DESCRIPTION

Multiple variants of a data processing system, which maintains I/O priority from the time a process makes an I/O request until the hardware services that request, will be described. In one embodiment, a data processing system has one or more processors having one or more processor cores, which execute an operating system and one or more applications of the data processing system. The data processing system also can have one or more non-volatile memory device coupled to the one or more processors to store data of the data processing system, and one or more non-volatile memory controller coupled to the one or more processors. The one or more non-volatile memory controller enables a transfer of data to at least one non-volatile memory device, and the priority level assigned by the operating system is maintained throughout the logical data path of the data processing system.

In one embodiment, I/O throughput of the various applications is managed by the operating system of the data processing system using an I/O throttling method. The throttling method includes receiving a first input/output operation having a first priority belonging to one or more applications on the operating system, and beginning an input/output data rate limit period associated with the first priority. After receiving a second input/output operation, an operation can be performed to delay the processing of the second input/output operation for a period of time, and processing the second input/output operation. Processing the second input operation maintains the assigned priority until the operation is completed.

In one embodiment, a non-transitory computer-readable medium stores instructions to manage a weighted priority queue. Managing the weighted priority queue involves operations such as adding an input/output operation having an initial timestamp to a queue based on the priority level of the input/output operation. The queue has a weight assigned by the data processing system. Additionally, the data processing system determines a deadline for the input/output operation, by which the operation will be processed immediately if not yet processed by the system. The deadline can be determined by adding the initial timestamp of the input/output operation to the weight of the queue.

The above summary does not include an exhaustive list of all aspects of the present invention. It is contemplated that embodiments of the invention include all systems and methods that can be practiced from all suitable combinations of the various aspects summarized above, and those disclosed below.

BRIEF DESCRIPTION OF THE DRAWINGS

The present invention is illustrated by way of example and not limitation in the figures of the accompanying drawings, in which similar references indicate similar elements.

DETAILED DESCRIPTION

Figure 1:
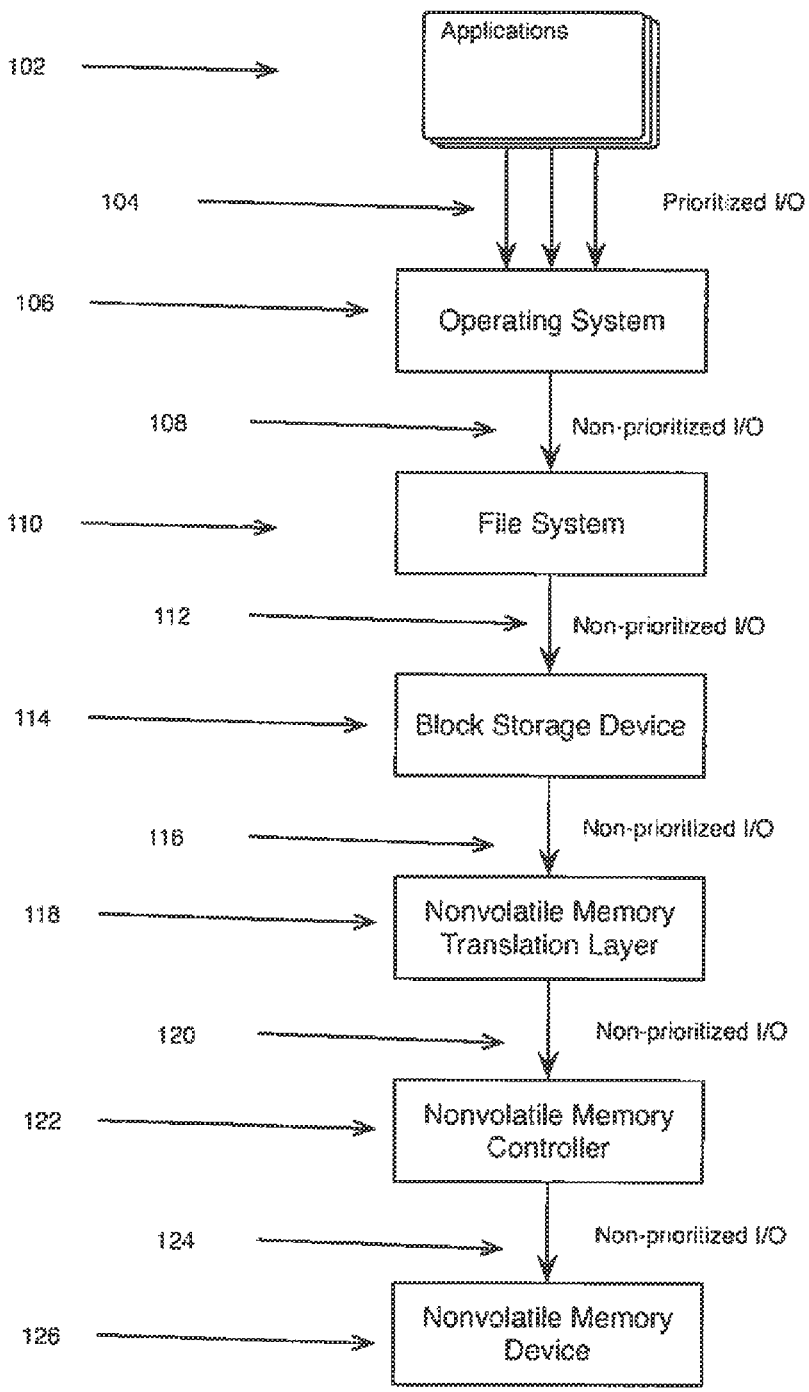
FIG. 1 is a flow diagram illustrating an example command flow and prioritization used by conventional operating systems on conventional data processing systems.

Various embodiments and aspects of a data processing system, including associated methods, will be described below. The figures accompanying the description will illustrate the various embodiments, and the discussion below will refer to the accompanying figures. While the following description and drawings are illustrative of the invention, they are not to be construed as limiting the invention. Numerous specific details are described to provide a thorough understanding of various embodiments of the present invention. However, in certain instances, well-known or conventional details are not described in order to provide a concise discussion of embodiments of the present inventions. Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Maintaining I/O priority across various levels of software and hardware can enable the various abstraction layers of the data processing system to intelligently determine the order in which incoming I/O requests are serviced and dispatched to lower abstraction layers. In one embodiment of a data processing system in which priority level is maintained throughout the system, it can be possible to have a high priority I/O operation serviced by hardware sooner than a previously dispatched lower priority operation. In one embodiment, low priority operations can be throttled to a known I/O rate, such that those operations will not be starved of resources, but the low priority operation's ability to harm I/O throughput for higher priority operations can be controlled deterministically. In one embodiment, a system of weighted queues with a deadline timeout allows out of order servicing of I/O operations. This system can be configured such that high priority operations to have a deterministic worst-case latency. In one embodiment, a nonvolatile memory controller with knowledge of the underlying storage hardware is leveraged to reorder operations, to balance I/O throughput and latency. Lower priority background operations with a high latency (e.g., garbage collection) can be preempted at the controller to allow a high priority operation to access the hardware. After which, the lower priority operation can resume.

In one embodiment, applications can be assigned a high, medium, or low priority based on the type of application. Directly interactive applications can be assigned a higher priority level than applications that are not directly interactive, or that are designed to run as a background application. For example, data server devices can have high priority applications that are highly interactive with other applications, memory, storage devices, or the network; it can be desirable to maintain a high degree of I/O throughput for those applications. Workstations, client devices, or mobile devices that interact with one or more users through a graphical user interface, can prioritize "foreground" applications that are actively being used. "Background" applications that are not currently being used can be assigned a lower priority. Some applications, such as data backup processes or system monitoring processes, may not be designed to be interactive, and run primarily in the background. Such programs can be assigned a low priority, and have their I/O throughput rate limited so as to not interfere with the I/O throughput of higher priority programs. In one embodiment, throughput can be metered by the use of access windows, in which I/O requests of one priority can cause lower priority operations to be processed at a limited rate. I/O access windows can be used to reduce the probability that follow up operations at a high priority level from a process at one priority level will be throughput limited by operations at a lower priority.

The processes depicted in the figures that follow are performed by processing logic that comprises hardware (e.g., circuitry, dedicated logic, etc.), software embodied on a non-transitory machine-readable storage medium, or a combination of both. Although the processes are described below in terms of some sequential operations, it should be appreciated that some of the operations described may be performed in a different order. Additionally, some operations may be performed in parallel rather than sequentially.

Figure 2:
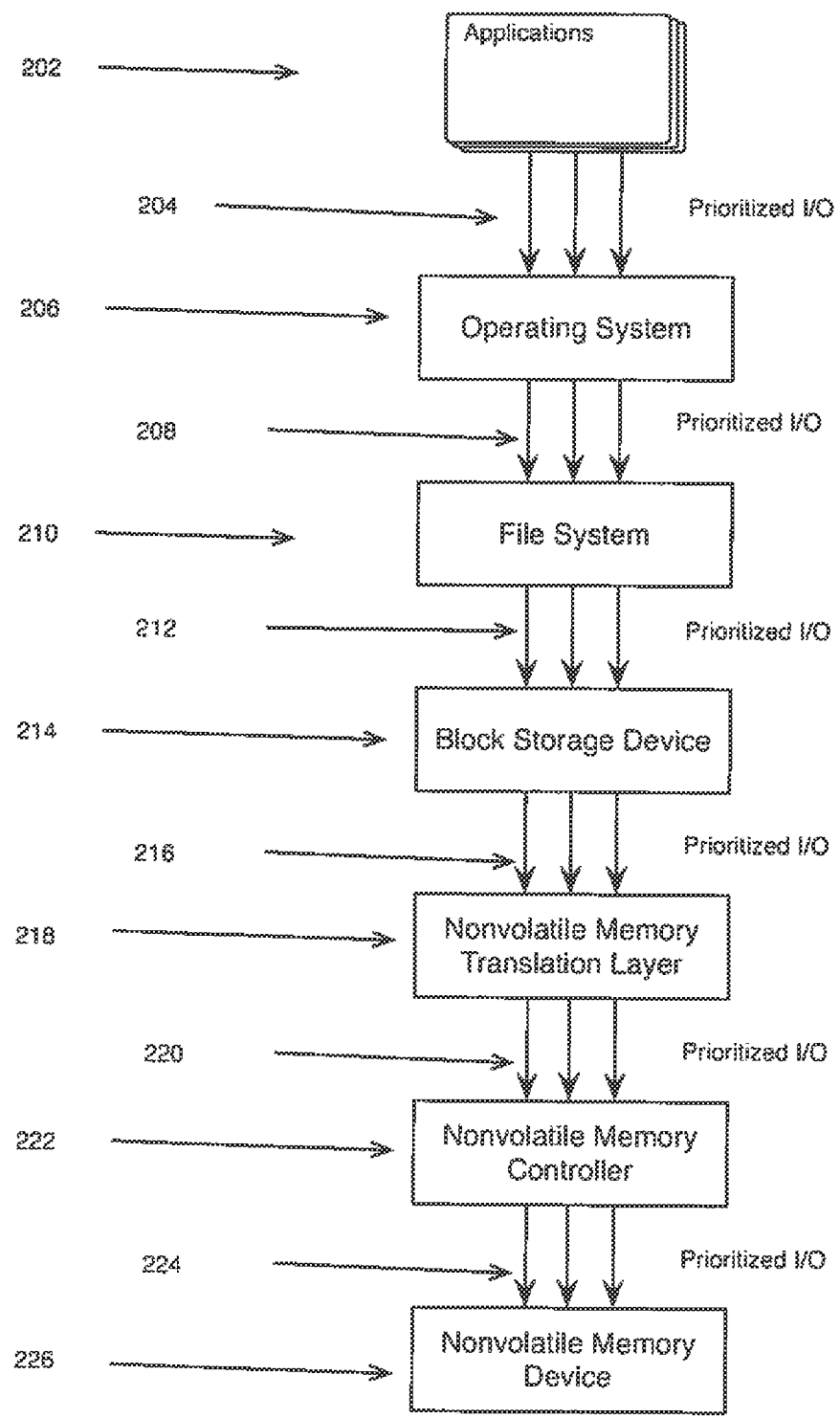
FIG. 2 is an illustration of I/O request flow through one embodiment of a data processing system in which I/O prioritization is maintained, according to one embodiment.

FIG. 2 is an illustration of I/O request flow through one embodiment of a data processing system in which I/O prioritization is maintained. The I/O infrastructure of the data processing system can include one or more user applications 202 with varying levels of priority; an operating system 206, to assign and manage the priority levels, and to accept I/O requests from the applications; a file system 210, to present a file and directory abstraction of a storage device to the operating system 206; and a block storage device 214, to present a block level abstraction of the underlying storage device to the higher levels of abstraction. When semiconductor memory is used as a storage device, a nonvolatile memory translation layer 218 can be used to abstract the semiconductor memory control interface to the block storage device 214. Additionally, a nonvolatile memory controller can be used to present a command interface to the nonvolatile memory translation layer, and abstract the underlying memory architecture of the nonvolatile memory device. Each of these components can be configured to maintain the assigned priority level assigned to an I/O request until the request is serviced by the hardware.

During system operation, the various processes and applications 202 executing on the operating system 206 can be dispatched with various priority levels, depending on the operating system configuration. In one embodiment, applications can have a high, a medium, or a low priority, although greater or fewer priority levels are possible. In general, processes or threads associated with an application inherit the priority level of the associated application. However, a process can be assigned a priority level that differs from the parent application of the process, and a process can spawn multiple threads, each with their own priority levels, which can be the same, or can differ from their parent process. In one embodiment, when a process, or thread of a process, makes a prioritized I/O request 204 to the operating system, the request generally has the same, or a lower priority of the requester. In one embodiment, the operating system can dispatch I/O requests at a "supervisor" level that can supersede all user priority levels.

In one embodiment, an I/O request received by the operating system 206 can be queued and processed by priority level, and various methods can be used to determine which process, and which queue, will be serviced at any given time. Once serviced by the operating system 206, the I/O request can be dispatched as a prioritized I/O request 208, with an attached header, descriptor, or some other data tag that indicates the priority of the request. For file I/O, the file system 210 presents a file and directory abstraction of the storage device to the operating system 206. In one embodiment, to service a request to access a file on the storage device, the operating system 206 can reference the file system 210 (via prioritized I/O request 208) to determine the size and locations of the data blocks of the file. The prioritized I/O request 208 to the file system 210 carries embedded priority data, allowing the file system to queue incoming requests according to the priority of the request.

In one embodiment, the block storage device 214 presents a block level abstraction of the underlying storage device. The physical data block is an elementary unit of storage presented to the tile system by the block storage device. The file system manages data on the block device using logical blocks, which are mapped to one or more physical blocks on the storage device. A logical block can be the same size as, or integer multiples of, the disk block size. When processing incoming requests 212 to the block storage driver, multiple queues can be used to sort the incoming processes by priority. In one embodiment, a throttling mechanism can be employed to reduce the throughput rate of low priority requests to preserve resources for higher priority tasks. The details of the software queuing and throttling will be further described in FIG. 4.

In one embodiment, a nonvolatile memory translation layer 218 can be used when the storage device is a semiconductor memory device. An electrically erasable semiconductor memory device, such as solid-state drive using multiple banks of flash memory, may not be directly accessible by the block device driver in a manner similar to hard disk drives. For example, a hard-drive-based system, unlike flash based memory, can overwrite a memory location without first performing a block erase, and does not use wear leveling, to increase the lifespan of the device. Therefore, a nonvolatile memory interface 218, such as a flash translation layer, can be used to abstract memory specific, or vendor specific functionality to the block device driver, so that file system requests can be handled in a suitable manner. The nonvolatile memory translation layer can be adapted based on memory specific requirements (e.g., flash specific), vendor specific requirements, or both, When the incoming requests 216 are prioritized, the nonvolatile memory translation layer can process the requests 216 in an appropriately prioritized manner.

In one embodiment, the nonvolatile memory translation layer 218 couples with and sends prioritized I/O requests 224 to the nonvolatile memory controller 222, to interface with a specific nonvolatile memory device 226. In one embodiment, the nonvolatile memory controller 222 is designed with an understanding of the underlying memory architecture of the nonvolatile memory device. Accordingly, the nonvolatile memory controller can accept interface commands, such as write and read commands, and access data stored in the nonvolatile memory device 226. Additionally, the nonvolatile memory controller 222 can perform techniques to the optimize performance of the nonvolatile memory, or perform techniques to preserve the lifespan of the memory. For example, if an en electrically programmable and electrically erasable semiconductor memory is in use, such as flash memory, each memory block can only withstand a limited number of program-erase cycles. If a particular flash memory block were programmed and erased repeatedly without writing to any other blocks, that one block would wear out before all of the other blocks, which will prematurely end the life of the storage device. To prolong the life of the storage device, flash controllers use as wear leveling technique, to distribute writes as evenly as possible across all the flash blocks in the solid-state disk. In one embodiment, the nonvolatile memory controller accepts input to identify the priority of incoming commands, and can utilize a prioritized queue system for incoming commands.

The nonvolatile memory controller 222 can be tuned based on the underlying nonvolatile memory device. In the event flash memory is in use, wear leveling and erase before write, among other functionality, is abstracted by a flash memory controller and a flash translation layer. Granting those layers access to the relative priority of the incoming requests can allow high priority tasks to be handled first, and can prevent low priority tasks from excessively limiting the throughput available to higher priority activities.

Figure 3:
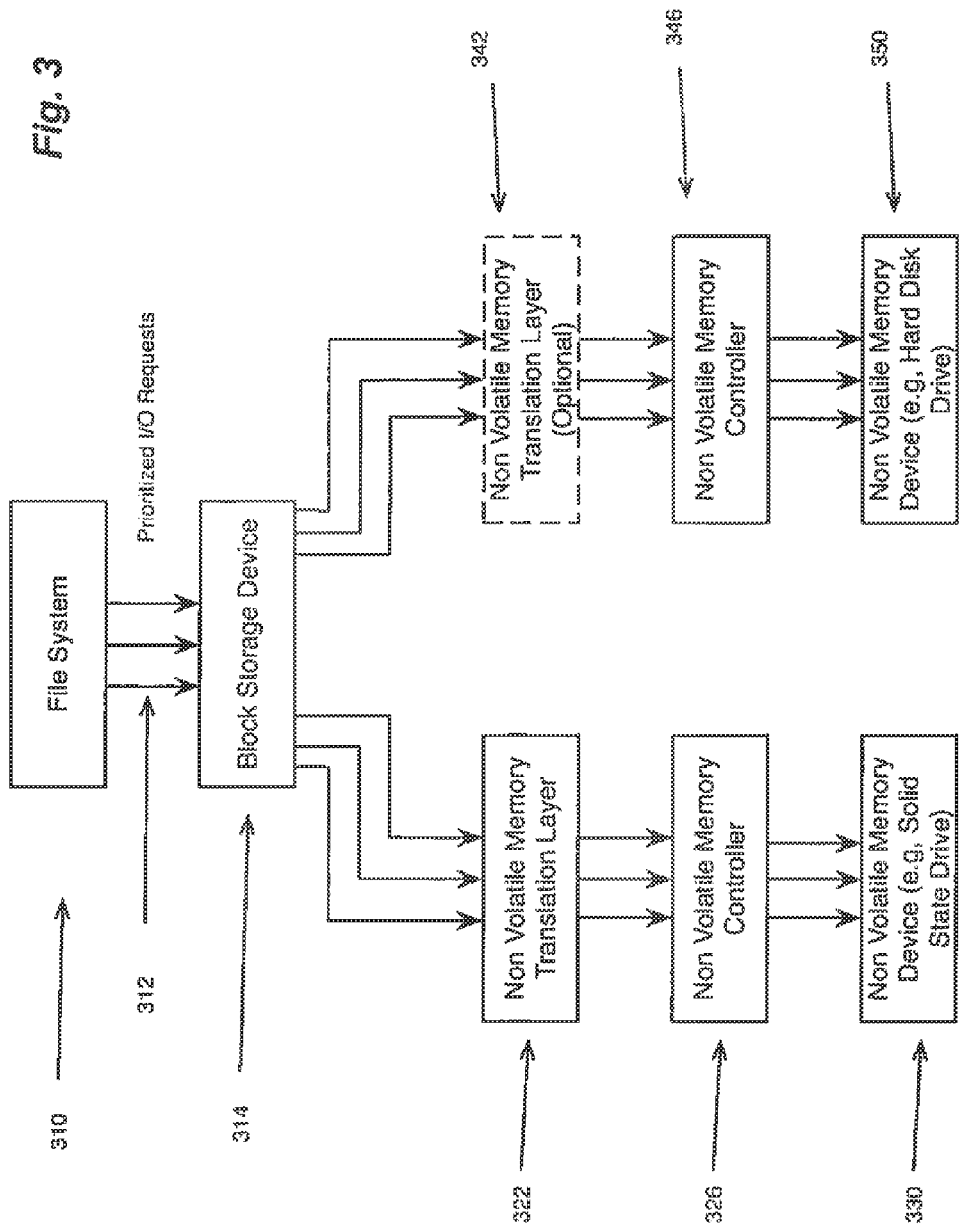
FIG. 3 is an illustration of I/O request flow through lower abstraction layers of a data processing system according to one embodiment in which multiple non-volatile memory devices are in place.

FIG. 3 is an illustration of how I/O requests flow through lower abstraction layers of a data processing system according to one embodiment in which multiple non-volatile memory devices are in place. In one embodiment, the data processing system utilizes system wide priorities for each nonvolatile memory device, and the data processing system can be tuned based on the individual storage devices. In one embodiment, the storage devices are of different types, with different performance characteristics. For example, the data processing system can contain a first nonvolatile memory device 330, which can be a solid state drive using flash memory, or some other semiconductor memory (e.g., magnetoresistive memory, ferroelectric memory), and a second nonvolatile memory device 350, which can also be a solid state drive, or can be a hard disk drive. In one embodiment, the block storage device 314 can present a logical disk abstraction to the file system 310 in which the prioritized I/O requests 312 are addressed to the first drive 330 and the second drive 350 as though the drives comprised a single storage device. In such embodiment, the block storage device 314 can tune its priority queues based on the known performance characteristics of each drive, and the overall system bandwidth available to all storage devices.

When multiple storage devices are in place, separate drivers and controllers can be used to manage each physical device. For example, semiconductor memory based storage devices can have a nonvolatile memory translation layer (e.g., memory translation layer 322) and a nonvolatile memory controller (e.g., memory controller 326) tuned for the type and architecture of the semiconductor memory device (e.g., memory device 330). Hard disk drives can have a separate support infrastructure, which can also have a priority queuing system that is tuned to the performance characteristics and usage model of the storage device. For example, if the second storage device 350 is a hard disk drive without a semiconductor memory component, a nonvolatile memory translation layer 342 may not be required, though, in one embodiment, a hard drive specific nonvolatile memory controller 346 is still used.

Figure 4:
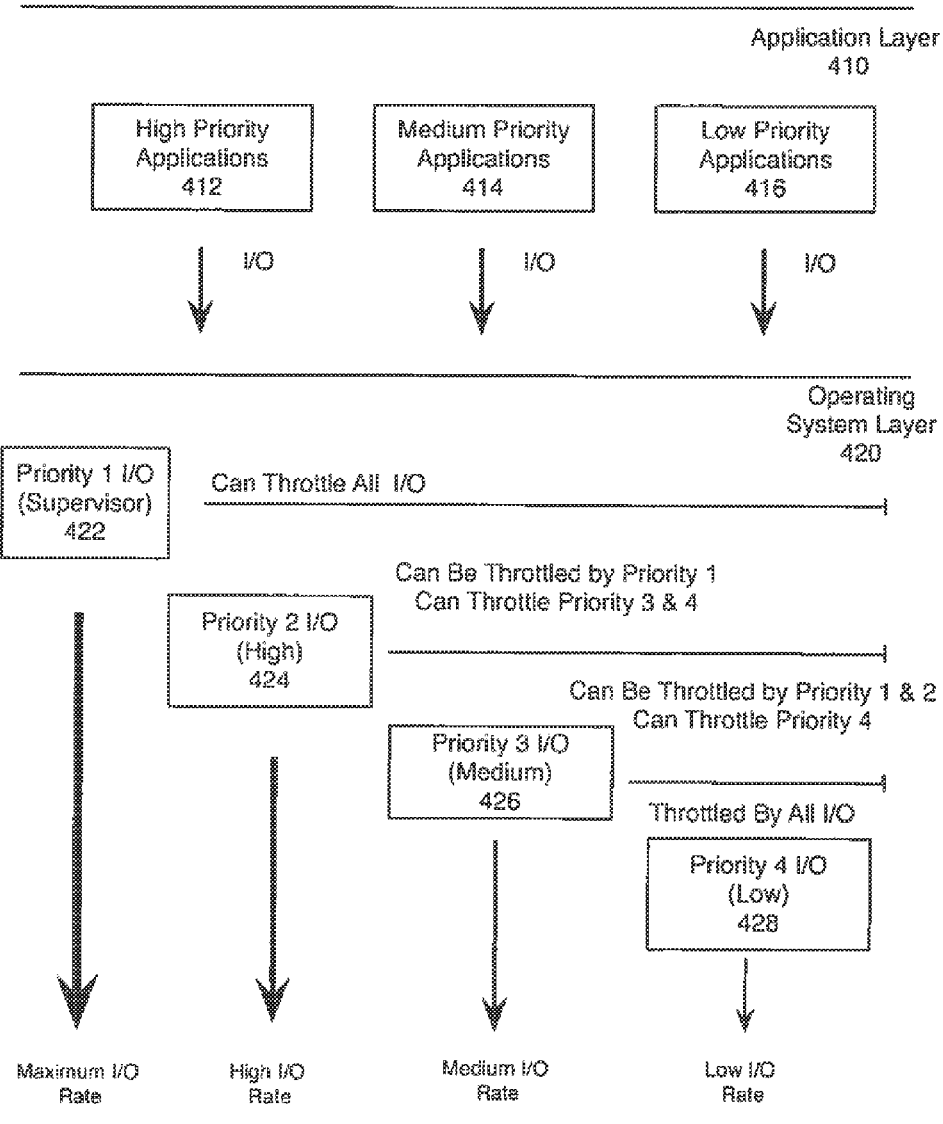
FIG. 4 is a diagram illustrating priority I/O rate limiting according to one embodiment.

FIG. 4 is a diagram illustrating priority I/O rate limiting according to one embodiment of the invention. Priority I/O windowing 400 includes multiple techniques where the I/O rate of the various applications is controlled based on priority level. In one embodiment, an application layer 410 of the data processing system includes one or more high priority applications 412. These applications can include highly interactive server applications on a server in a network data center, a game application running on a mobile device, or a foreground application on a desktop workstation computer. Additionally, multiple applications 414 with a medium priority can also be active. Medium priority applications 414 can include applications that are active, but are not "foreground" applications, which means they are not currently interactive with a user, or with other applications. Several types of medium priority applications 414 are possible, and generally include applications that are not currently highly interactive, or do not currently require low latency access to I/O, but which may become highly interactive at any given time. One or more low priority applications can also exist on the system. Low priority applications 416 include applications that are generally non-interactive, and that are designed to work in the background with little direct interaction with the user, or with other applications or processes on the data processing system. These applications 416 can be allowed limited access to I/O resources, such that the applications are not starved resources, but the access is limited such that the low priority applications 416 do not limit available I/O resources for high priority applications 412.

In one embodiment, applications in the application layer 410 begin with a default priority level for processor and I/O scheduling. In one embodiment, the default priority level can be a medium priority level, and applications can be temporarily promoted to high priority when necessary, then reverted to medium priority, and background and non-interactive processes can be pushed from a medium to a low priority state. In one embodiment, the default priority level is a low priority level, to preserve available I/O bandwidth, and applications can be promoted by the operating system as needed to enhance overall user experience. In one embodiment, I/O scheduling priority is based on processor scheduling priority. In one embodiment, scheduling priority and I/O the priority can vary independently based on whether an application or process is in a compute bound or I/O bound condition. Additionally, applications can request high priority status from the operating system though one or more application programming interface (API) calls. In one embodiment, applications can be assigned a priority status by a user.

In one embodiment, each priority class of applications in the application layer 410 can dispatch I/O requests with a priority level as high as the relative processing priority of the application. Such requests can be received by the operating system layer 420 and assigned a queue based on the priority of the incoming request. In one embodiment, a priority I/O windowing system 400 is in place such that the operating system limits the I/O rate of operations based on priority. High 424, medium 426, and low 428 priority I/O request can be processed from the application layer 410, though in some embodiments, a larger or smaller number of priority levels can be used. In one embodiment, the operating system can dispatch. I/O commands with a supervisor priority 422. Each priority level can be assigned an I/O rate that limits the I/O throughput for each level of priority request, to preserve I/O resources for higher priority requests. Low priority I/O 428 can be assigned the lowest I/O rate in relation to the other I/O rates, medium priority I/O 426 can be assigned a median, or middle I/O rate between the other priority levels, and high priority I/O 424 can be assigned the highest I/O rate. The operating system can address each queue in prioritized order, to process the incoming I/O requests and convert them into the appropriate I/O commands for the underlying levels of abstraction. In one embodiment, I/O commands dispatched with supervisor I/O is not rate limited in any manner, and the operating system can use such a priority level when it is desirable to supersede all user I/O requests.

As shown in FIG. 4, one embodiment of priority I/O rate limiting 400 uses throttling to limit the degree of impact a lower priority process or application can have on the throughput of a higher priority process or application. In one embodiment, the operating system can dispatch a supervisor level I/O command at priority one 422, and throttle all user level I/O until supervisor operations are complete, or for a period after supervisor operations are complete. Additionally, a high priority user level I/O request can be processed and dispatched as a priority level two command, and the operating system can throttle the I/O processing and dispatch rate of I/O operations at priority three 426 and priority four I/O 428. Likewise, priority three I/O operations 426 can slow the processing and dispatch rate of low priority I/O at priority four 428. When a priority level is throttled, the normal rate of service for the priority level is reduced by the I/O scheduler in favor of a higher priority level.

Throttling can also be used to handle "false idle" scenarios in which high priority I/O occurs in short, non-contiguous bursts. A false idle occurs when a number of I/O requests occur within a short amount of time, with a small time period between each request. These I/O requests can result from a series of dependent I/O requests, where a later I/O request depends on the result of a previous I/O request. Generally, when one high priority request is handled, there is a higher probability that additional high priority requests will follow the initial request. However, during the false idle between high priority I/O requests, a lower priority task may be queued and addressed ahead of an imminent, but not yet received higher priority request.

Several methods can be used to perform throttling and I/O rate limiting. In one embodiment a delay can be used after processing a request from a high priority queue, in which only high priority requests will be handled for a period of time before lower priority requests are processed at the normal processing rate. In one embodiment, each queue can be given a period of time in which requests are processed from that queue, and the period of time allocated to lower priority queues can be reduced when a higher priority queue is active. Additionally, queues can be throttled by using a minimum batch size, in which a certain number of I/O requests for a given priority level can be grouped before the request is dispatched. For example, the operating system can delay processing of the low priority queue until at least a certain number of requests are in the queue. If the minimum number is, for example, four requests, processing for the low priority queue can be suspended until at least four requests are present in the queue. The system can then process all requests, the minimum batch size, or some number in between. The batching number for each priority class can be adjusted as needed to limit the I/O rate for that class.

Figure 5:
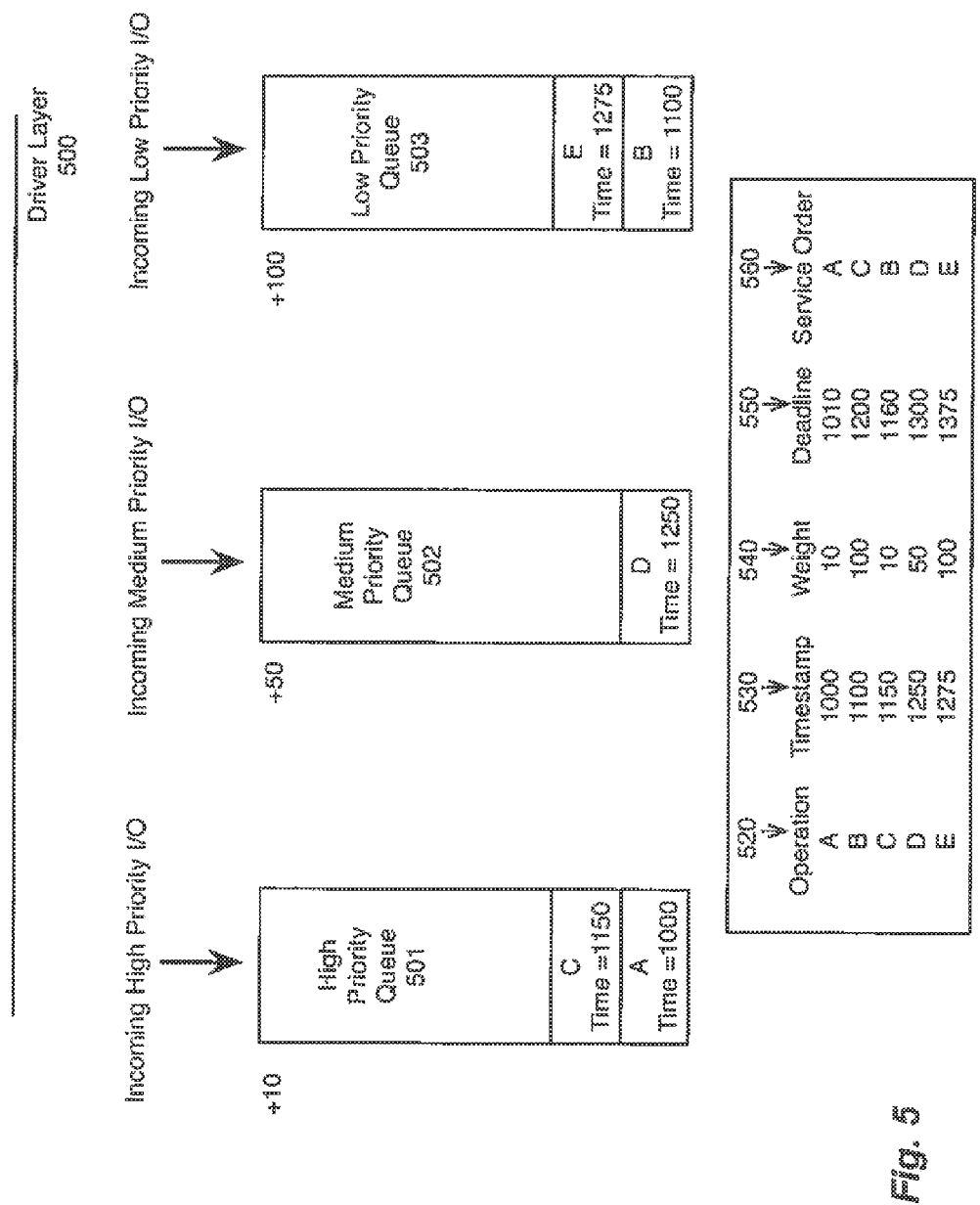
FIG. 5 is an illustration of software queues that can be used when managing I/O of various priorities, according to one embodiment.

FIG. 5 is an illustration of software queues that can be used when managing I/O of various priorities. In one embodiment, the software queuing system described is used in the driver layer 500 to manage I/O commands dispatched from the operating system layer 420, as shown in FIG. 4. Driver layer 500 components can include the block storage device 214 and the nonvolatile memory translation layer 218 as shown in FIG. 2. One or both of those components can implement the software queues as described. In one embodiment, a high priority queue 501, a low priority queue 502, and a medium priority queue 503 are used to accept incoming prioritized I/O commands. In one embodiment, the various queues can be addressed in a round-robin fashion, where each queue is addressed sequentially. One or more commands in the high priority queue 501 can be processed, followed by one or more commands in the medium priority queue 502, followed by the low priority queue 503, followed by the high priority queue, 501, etc. In one embodiment, low priority queue throttling is enabled using the batching method as previously described. When botching is enabled, a batch number can be assigned to the low priority queue, and commands can be processed from that queue when the number of queued commands reaches the batch number.

In one embodiment, a weighted deadline system can be used to provide a deterministic worst-case deadline by which an I/O command will be processed. In such embodiment, each incoming command is marked with a timestamp for the time when the I/O command is received and a weight value assigned to the priority queue in which the command is placed is added to the timestamp to determine the deadline. The timestamp can be the time of receipt of the I/O command by the operating system, or the time in which the I/O command is placed into the priority queue. The timestamp can be based on a system clock of the data processing system, or can be based on Coordinated Universal Time (UTC), or the system clock of second data processing system. The queues can be processed in a round-robin fashion, where one or more operations in each successive queue can be processed, however any commands that remain outstanding long enough to reach their deadline will be processed out of round-robin order. The precise weight values used can be tuned based on the performance characteristics of the underlying storage device, but generally the high priority queue can be given a low weight, while the low priority queue can be given a high weight. In one embodiment, an un-weighted supervisor queue (not shown) can be used, in one embodiment, any operating system I/O commands in the supervisor queue would be processed before all other commands.

In the example shown in FIG. 5, the high priority queue 501 has a weight of +10, the medium priority queue 502 has a weight of +50, and the low priority queue has a weight of +100, though these weights are for example purposes only. In this example, five incoming I/O operations are illustrated. A high priority operation A, with an example timestamp of 1000; a low priority operation B, with an example timestamp of 1100; a high priority operation C, with an example timestamp of 1150; a medium priority operation D, with a timestamp of 1250; and a low priority operation E, with a timestamp of 1275. When there is little contention for I/O resources, the queues can be addressed in round-robin fashion, and any waiting commands can be processed.

However, if I/O congestion causes the scheduler to fall behind, I/O commands will be processed out of round-robin order by deadline. Referring to the chart of FIG. 5, the I/O command operations 520, timestamps 530, weight 540, and deadline 550 of each of the example operations are listed. In a worst-case scenario, assuming no operations are processed until their deadline, a service order 560 is established. High priority command operation A, with a timestamp of 1000, and a high priority queue weight of 10 has a deadline of 1010. Although high priority operation C, with a timestamp of 1150, arrived after operation B, with a timestamp of 1100, operation B is a low priority operation with a higher weight, therefore operation C has a lower deadline of 1160, and can be processed ahead of operation B, with a deadline of 1200. As shown in column 560, in one embodiment, a worst-case deadline-only scheduling order of A, C, B, D, and E can be established.

Figure 6:
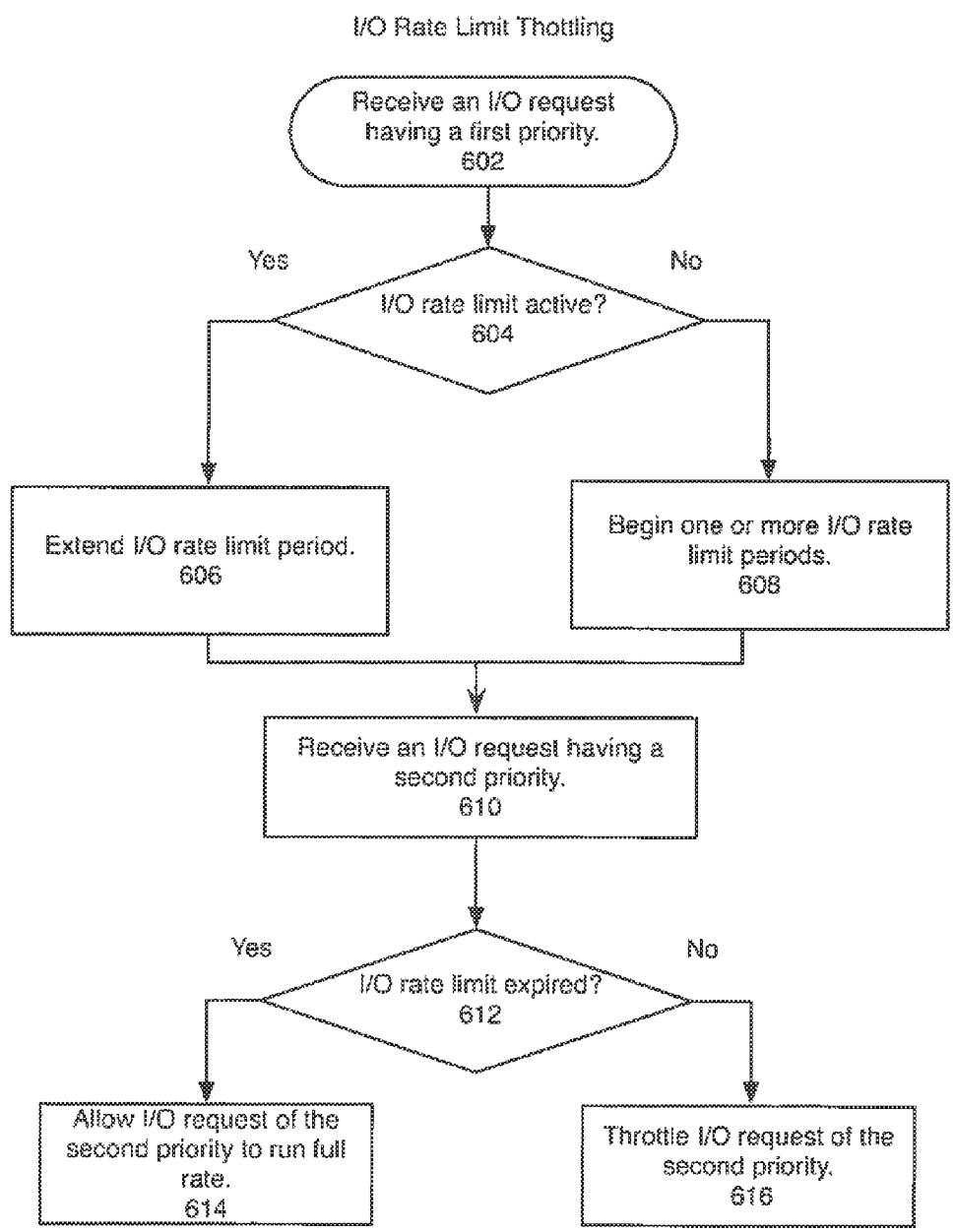
FIG. 6 is a flow diagram illustrating the logic of I/O rate limit throttling according to one embodiment.

FIG. 6 is a flow diagram illustrating the logic of I/O rate limit throttling according to one embodiment. In one embodiment, the data processing system performs I/O rate limiting at the operating system level 420, as illustrated in FIG. 4, although embodiments of I/O rate limiting can also be performed in the driver level 500 as illustrated in FIG. 5. When an I/O request having a first priority is received 602, the system can perform an operation 604 to determine if a current I/O rate limit period is active. The first priority I/O request can be a supervisor priority request (e.g., priority one I/O 422), or can be a high priority request (e, g, priority two I/O 424) as in FIG. 4. If the system determines 604 that an I/O rate limit associated with the first priority is active, the system can perform an operation 606 to extend the I/O rate limit period. If the system determines 604 that an I/O rate limit is not currently active the system can perform an operation 60 to begin one or more I/O rate limit periods.

In one embodiment, each time an I/O operation having the first priority is received, the system can extend the period in which I/O requests having a second priority are throttled, to limit the I/O rate of requests having the second priority. The I/O request having a second priority can be a high priority request (e.g., priority two I/O 424), a medium priority request (e.g., priority three I/O 426), or a low priority request (e.g., priority four I/O 428). In one embodiment, multiple priority levels can be throttled. For example, if a supervisor I/O operation is dispatched by the operating system of a data processing system, the system may begin to limit the I/O rate of all user mode processes, including high, medium, and low priority processes. Additionally, a high priority I/O request from an application can cause low priority I/O requests to be throttled, and can additionally throttle medium priority requests as well. In one embodiment, each of the multiple priority levels can be throttled at a different I/O rate when a rate limit period is active.

When the system receives 610 an I/O request having a second priority, the system determines 612 if any of the potentially outstanding I/O rate limits associated with the first priority are currently active, or if they have all expired. After period, the I/O rate limit will expire, and the any additional I/O requests having the second priority can run at the "full" I/O rate associated with the priority, which can be an unlimited I/O rate, or can be a partially limited I/O rate. If all applicable I/O rate limits have expired, then the data processing system can allow 614 the I/O requests of the second priority to run at full rate. In one embodiment, the length of the rate limit period can be determined automatically by the data processing system based on one or more performance characteristics associated with the target I/O device. In one embodiment, the length of the rate limit period can be turned heuristically, during system development, or post deployment. If the data processing system determines 612 that at least one I/O rate limit period affecting I/O requests of the second priority is active, the data processing system can throttle 616 the I/O request of the second priority.

Figure 7:
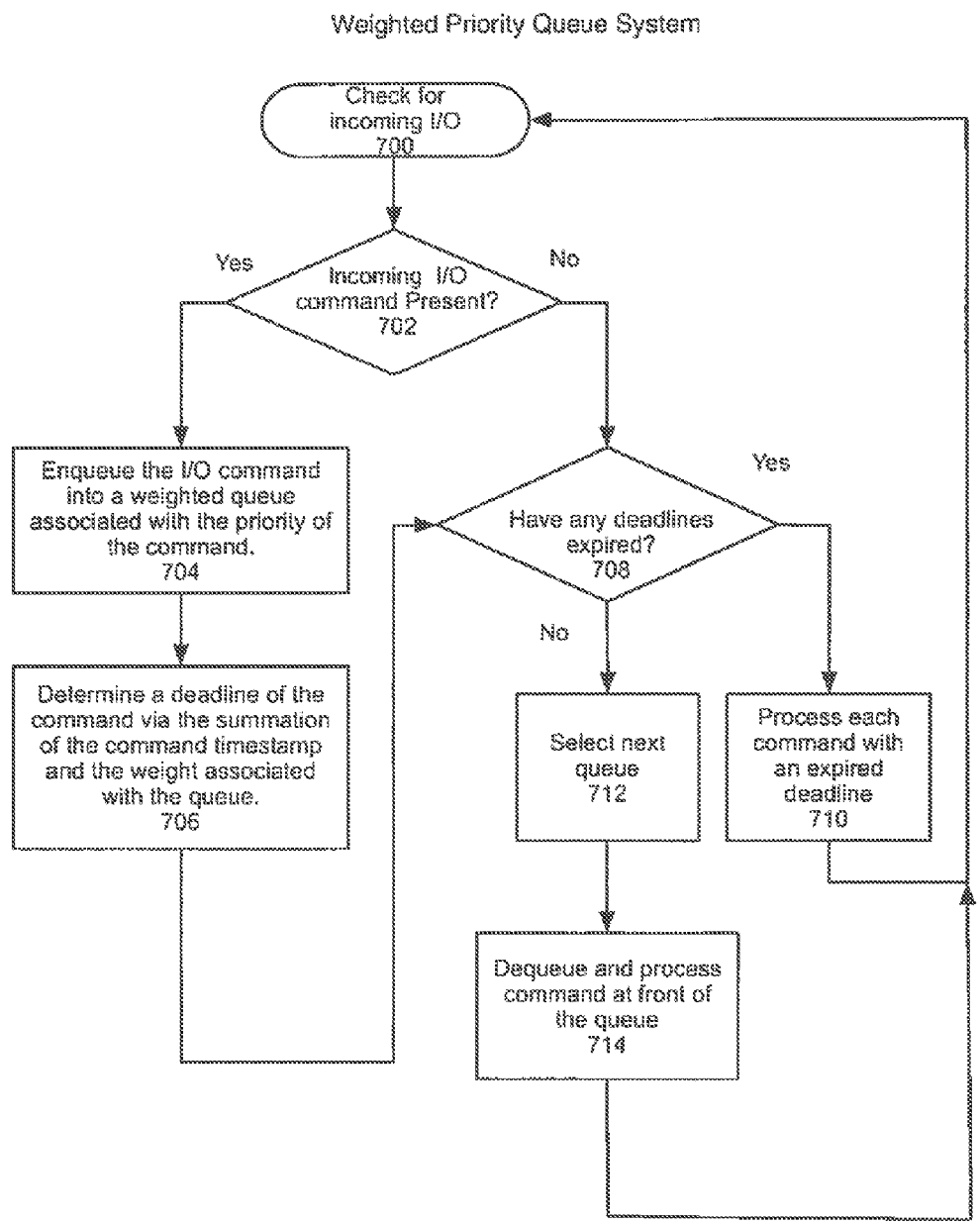
FIG. 7 is a flow diagram illustrating the logic of priority I/O queuing according to one embodiment.

FIG. 7 is a flow diagram illustrating the logic of priority I/O queuing according to one embodiment. In one embodiment, weighted priority queuing can be used in the driver layer 500, as shown in FIG. 5, to arbitrate the various priority queues used to process incoming I/O commands from the operating system, although elements of the priority queue system can also be applied to the operating system layer 420, as shown in FIG. 4. Driver layer 500 components of the data processing system can include the block device abstraction 214 and the nonvolatile memory translation layer 218, as shown in FIG. 2.

In one embodiment, the weighted I/O queue logic begins by checking 700 for incoming I/O commands from the higher abstraction layers. The system can determine 702 if any incoming I/O commands are buffered for processing, and can enqueue 704 any buffered I/O commands into a weighted queue associated with the priority of the incoming I/O command. In one embodiment, at least three weighted queues can be used to sort incoming I/O commands based on priority. A first, second, and third priority queue can be used, and each queue can have a first, second and third priority associated with each respective queues. The first priority queue can be associated with operations having a high priority, while the second priority queue can be associated with operations having a medium priority, while the third priority queue can be associated with operations having a low priority. In one embodiment, a fourth or fifth queue can be available, one of which can be associated with a supervisor priority level for commands dispatched by the operating system. In one embodiment, supervisor queues can have a weight of zero. Embodiments are not limited to any specific number of priorities, or any number of associated priority queues. Each of the priority queues can have a weight associated with the queue. In one embodiment, the various weights can be determined automatically by the data processing system based on one or more performance parameters associated with the target of the I/O operation. In one embodiment, the various weights can be determined heuristically during development of the data processing system, or post deployment.

The data processing system can determine 706 a deadline associated with the enqueued I/O command by adding the timestamp of the I/O command with the weight associated with the queue of the I/O command. In one embodiment, the deadline represents a quality of service goal by which the system will work towards servicing a given command on or before the command deadline. In one embodiment, once any incoming I/O commands have been enqueued, or if there are no new I/O commands, the system can determine 708 if there are any expired deadlines. The system can determine 708 if there are any expired deadlines by comparing the deadlines of the I/O commands to a reference time, which can be derived from a system clock, a hardware clock, or some other clock associated with the data processing system. If a supervisor queue with a zero weight is present, any I/O commands of this priority will immediately reach their deadline. If any commands have reached their deadline, including immediately enqueued supervisor commands, those I/O commands are processed 710, and the system can proceed to check 700 for any additional incoming I/O. If no commands have reached their deadline, the system can select 712 the next queue, and perform operations to dequeue 714 and processed the command at the front of the queue. In one embodiment, when no commands have reached their process deadline, each queue is addressed in round-robin fashion and the I/O command at the front of the queue is processed. In one embodiment, multiple commands from each queue are processed before moving to the next queue.

Figure 8:
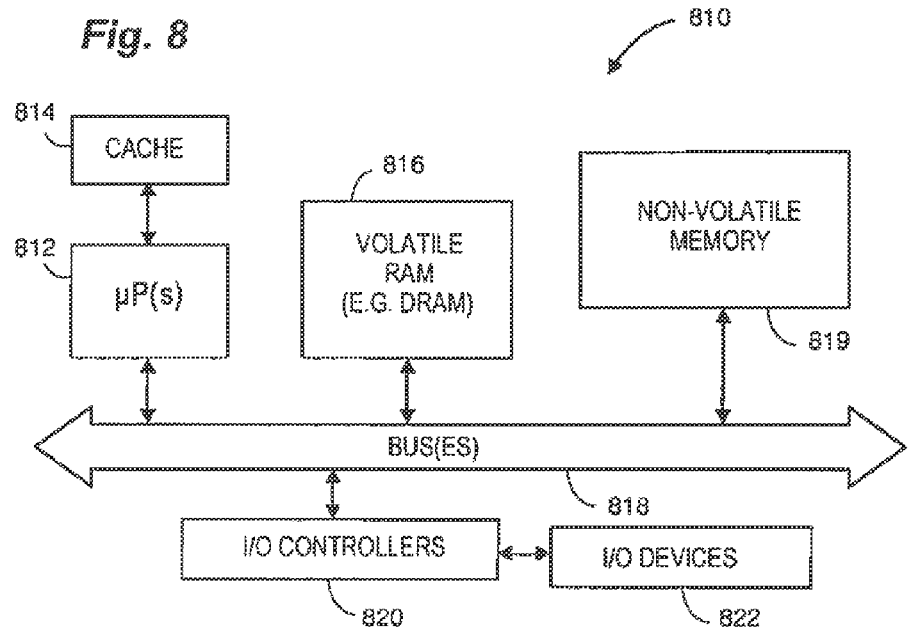
FIG. 8 shows an exemplary data processing system, according to one embodiment.

FIG. 8 shows an exemplary data processing system 810 which can be employed with one or more embodiments described herein. The system 810 can be a server, or a workstation computer system, a mobile data processing system, such as a smartphone or tablet computer, or some other mobile computer system, such as a laptop computer system. The system 810 can include one or more microprocessors or other logic units 812 coupled to an cache memory system 814 which, in one embodiment, can be static random access memory (SRAM), as known in the art. The one or more microprocessors 812 can couple to the rest of the system via one or more system buses 818, which can also couple the one or more microprocessors 812 to main memory, which can be volatile random access memory, such as dynamic random access memory (DRAM). The system 810 can also include one or more input/output controllers 820, which couple the one or more input/output devices 822 with the rest of the system through the one or more buses 818. The system 810 can also include a non-volatile memory 819, which can be a conventional magnetic disk drive, a solid state drive, or a composite disk, such as a combination of a solid state, drive and a conventional magnetic disk drive. In one embodiment, the various I/O rates, throttle periods, and queue weights, as described above, can be determined by the performance parameters associated with the various storage devices used as non-volatile memory 819 within the system.

Figure 9:
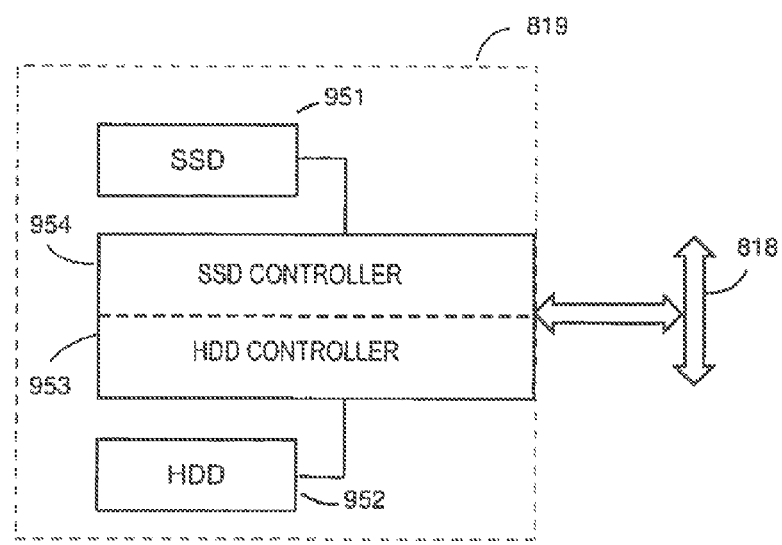
FIG. 9 shows an example of a non-volatile memory based data storage system, according to one embodiment.

FIG. 9 shows an example of a non-volatile memory based data storage system, which in one embodiment can be a composite disk. In one embodiment, the non-volatile memory 819 of FIG. 8 can include a solid-state drive 951 and a magnetic disk drive 952. In one embodiment, the non-volatile storage system can be treated as a single logical volume or a single block device by the file system and operating system. The solid-state drive can consist of one or more banks of single level cell (SLC) or multi level cell (MLC) flash memory, or some other electrically erasable semiconductor memory. The various storage devices in the non-volatile memory system 819 can be controlled by one or more controllers, such as controller 953, which includes a solid-state drive controller, and controller 954, which includes a hard disk drive controller. The one or more controllers can couple the composite drive shown in FIG. 9 to the rest of the components in system 810 through the bus 818.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory computer-readable medium with instructions stored therein, the instructions, when executed by a data processing system, cause the data processing system to perform a method of processing one or more input/output operations having a timestamp and a priority level, the method comprising:
    adding an input/output operation to a queue based on the priority level of the input/output operation, wherein the queue has a weight assigned by the data processing system;
    determining a deadline of the input/output operation by adding the timestamp of the input/output operation to the weight of the queue;
    determining if the deadline of one or more input/output operations has expired by comparing the deadline of the one or more input/output operations to a reference time;
    and processing at least one of the operations with an expired deadline, wherein the processing maintains the assigned priority until the operation is completed by the data processing system.

2. The computer-readable medium of claim 1, further comprising:
    receiving an input/output operation with a priority level assigned by the data processing system.

3. The computer-readable medium of claim 1, wherein the reference time is determined by a system clock of the data processing system.

4. The computer-readable medium of claim 1, wherein the reference time is determined by a reference clock external to the data processing system.

5. The computer readable medium of claim 1, further comprising selecting an additional queue to process based on round-robin arbitration.

6. The medium of claim 1, wherein an operating system throttles the transfer of data from a second application, to preserve the input/output rate of a first application, wherein the priority of the first application is superior to the priority of the second application.

7. The medium of claim 6, wherein data transfers originating from the operating system have a supervisor priority, wherein the supervisor priority is superior to all priorities assigned to the one or more applications.

8. The medium of claim 1, wherein the at least one non-volatile memory device of the data processing system is abstracted as a block storage device, and wherein the block storage device is abstracted to an operating system by a file system, wherein the file system and the block storage device maintain the priority level assigned by the operating system.

9. The medium of claim 8, wherein the block storage device prioritizes transfer of data via a system of weighted queues, wherein the weighted queues are arbitrated in a round-robin fashion, and wherein members of the weighted queues have scheduling factors including the timestamp, a weight, and a deadline.

10. The medium of claim 1, wherein the priority of each input/output operation is derived from the priority of the one of more applications associated with the input/output operation.

11. A machine implemented method of processing one or more input/output operations on a data processing system, the one or more input/output operations having a timestamp and a priority level, the method comprising:
adding an input/output operation to a queue based on the priority level of the input/output operation, wherein the queue has a weight assigned by the data processing system;
determining a deadline of the input/output operation by adding the timestamp of the input/output operation to the weight of the queue;
determining if the deadline of one or more input/output operations has expired by comparing the deadline of the one or more input/output operations to a reference time;
and processing at least one of the operations with an expired deadline, wherein the processing maintains the assigned priority until the operation is completed by the data processing system.

12. The method of claim 11, further comprising:
receiving an input/output operation with a priority level assigned by the data processing system.

13. The method of claim 11, wherein the reference time is determined by a system clock of the data processing system.

14. The method of claim 11, wherein the reference time is determined by a reference clock external to the data processing system.

15. The method of claim 11, further comprising selecting an additional queue to process based on round-robin arbitration.

16. The method of claim 11, wherein an operating system throttles the transfer of data from a second application, to preserve the input/output rate of a first application, wherein the priority of the first application is superior to the priority of the second application.

17. The method of claim 16, wherein data transfers originating from the operating system have a supervisor priority, wherein the supervisor priority is superior to all priorities assigned to the one or more applications.

18. The method of claim 11, wherein the at least one non-volatile memory device of the data processing system is abstracted as a block storage device, and wherein the block storage device is abstracted to the operating system of the data processing system by a file system, wherein the file system and the block storage device maintain the priority level assigned by the operating system.

19. The method of claim 18, wherein the block storage device prioritizes transfer of data via a system of weighted queues, wherein the weighted queues are arbitrated in a round-robin fashion, and wherein members of the weighted queues have scheduling factors including the timestamp, a weight, and a deadline.

20. The method of claim 11, wherein the priority of each input/output operation is derived from the priority of the one of more applications associated with the input/output operation.

* * * * *